United States Patent [19]

Molins et al.

[11] 4,059,120
[45] Nov. 22, 1977

[54] MANUFACTURE OF CIGARETTES

[75] Inventors: Desmond Walter Molins; John Alfred Mills; Eryk Stefan Doerman, all of London, England

[73] Assignee: Molins Limited, England

[21] Appl. No.: 546,673

[22] Filed: Feb. 3, 1975

[51] Int. Cl.² .................... G01M 3/26; G08B 29/00
[52] U.S. Cl. .................................. 131/23 R; 73/1 R; 340/410
[58] Field of Search .............. 73/1 R, 157, 432 SD; 131/23 R; 340/410

[56] References Cited

U.S. PATENT DOCUMENTS

| | | | |
|---|---|---|---|
| 2,924,223 | 2/1960 | Miller | 131/23 R X |
| 3,117,479 | 1/1964 | Bisbis | 73/1 R X |
| 3,483,873 | 12/1969 | Hinzmann | 131/23 R |
| 3,491,767 | 1/1970 | Kaeding | 73/45.2 X |
| 3,701,353 | 10/1972 | Pasquine et al. | 131/23 R |

FOREIGN PATENT DOCUMENTS

| | | | |
|---|---|---|---|
| 1,195,682 | 6/1970 | United Kingdom | |
| 1,318,032 | 5/1973 | United Kingdom | 73/45.2 |
| 252,862 | 9/1969 | U.S.S.R. | 73/157 |

Primary Examiner—Jerry W. Myracle
Assistant Examiner—John S. Appleman
Attorney, Agent, or Firm—Craig & Antonelli

[57] ABSTRACT

This invention is concerned with cigarette making systems including a testing device for detecting bad quality cigarettes. Basically, the cigarette testing device is itself tested by deliberately making test cigarettes containing predetermined faults and checking whether the test cigarettes are detected by the testing device. The deliberate faults may be holes deliberately made in the cigarette wrappers. The holes may be made either on the cigarette paper web before it is wrapped around the filler in a continuous rod cigarette making machine, or the holes may be made in the wrappers of finished cigarettes.

13 Claims, 3 Drawing Figures

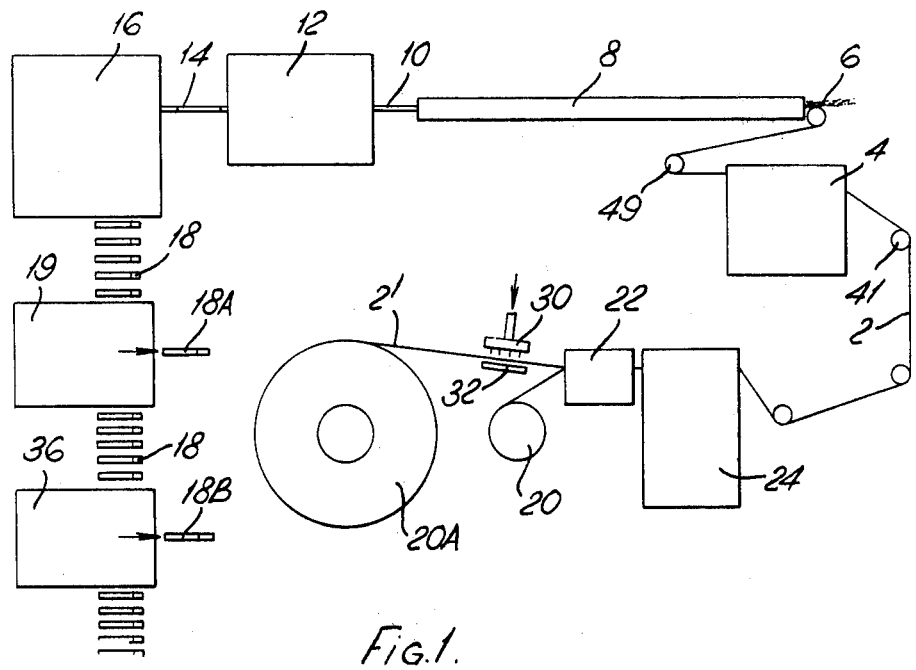
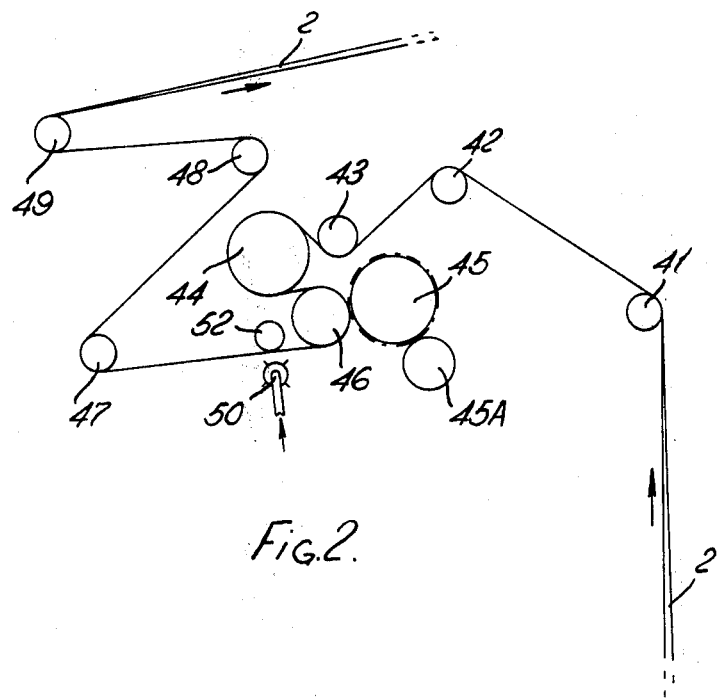

MANUFACTURE OF CIGARETTES

This invention is concerned with cigarette making systems including a testing device for detecting bad quality cigarettes. Basically according to this invention the cigarette testing device is itself tested by deliberately making cigarettes including predetermined faults and by checking whether the testing device detects those cigarettes having the deliberate faults.

This invention is concerned mainly with cigarette making systems, particularly for the manufacture of filter-tipped cigarettes, including means for testing the finished cigarettes to detect any leaks caused by holes or incomplete seams in the cigarette wrappers. Examples of cigarette testing devices for this purpose are described in our British patent specifications Nos. 1,036,889, 1,195,682 and 1,217,203.

According to one aspect of this invention a method of making cigarettes comprises the steps of forming a filler, enclosing the filler in a wrapper to form a continuous rod, severing the rod to form cigarette portions, and feeding the cigarettes to a testing device to detect leaks in the wrappers of the cigarettes, in which some of the cigarettes are deliberately made with leaks in their wrappers of predetermined size so that the performance of the testing device may be judged according to whether the cigarettes containing the deliberate leaks are detected by the testing device.

Also according to this invention a cigarette making system comprises a continuous rod cigarette making machine and a testing device for detecting leaks in the wrappers of the cigarettes, in which the system includes means for deliberately making some of the cigarettes with leaks of predetermined size in their wrappers, and means for monitoring whether the cigarettes with the deliberately leaky wrappers are detected by the testing device.

The deliberate leaks may be formed by means of deliberately made holes in the wrappers of the cigarettes.

The testing device may have an ejection station associated with it which ejects faulty cigarettes. In a preferred arrangement there is also a second ejection station which automatically ejects cigarettes containing deliberate leaks which were not ejected at the first ejection station.

The hole forming mechanism may be arranged to operate in response to the pressing of a button by the machine operator. Alternatively, it may operate automatically at regular or at random intervals. In both cases it is convenient if the hole forming mechanism is arranged to form holes in several successive cigarettes or cigarette length portions of cigarette paper. The positions of the holes are preferably timed to ensure that the holes are not covered by the "cork" or other web material which is used to join the filters to the tobacco portions of filter-tipped cigarettes.

Ejection at the second ejection station of any cigarettes with deliberately formed holes which pass the first ejection station (i.e. are not detected by the inspection device) may be achieved by means of a memory device activated by the formation of the holes. Alternatively, cigarettes with deliberately formed holes may be marked, for example with a magnetic ink, and the system may include means just upstream of the second ejection station for detecting such marks and for ejecting the cigarettes at the second ejection station.

Examples of systems according to this invention will now be described with reference to the accompanying drawings. In the drawings:

FIG. 1 is a diagrammatic representation of one form of cigarette making system according to the invention;

FIG. 2 shows diagrammatically an alternative way of forming the holes in the cigarette paper.

Figure 3:
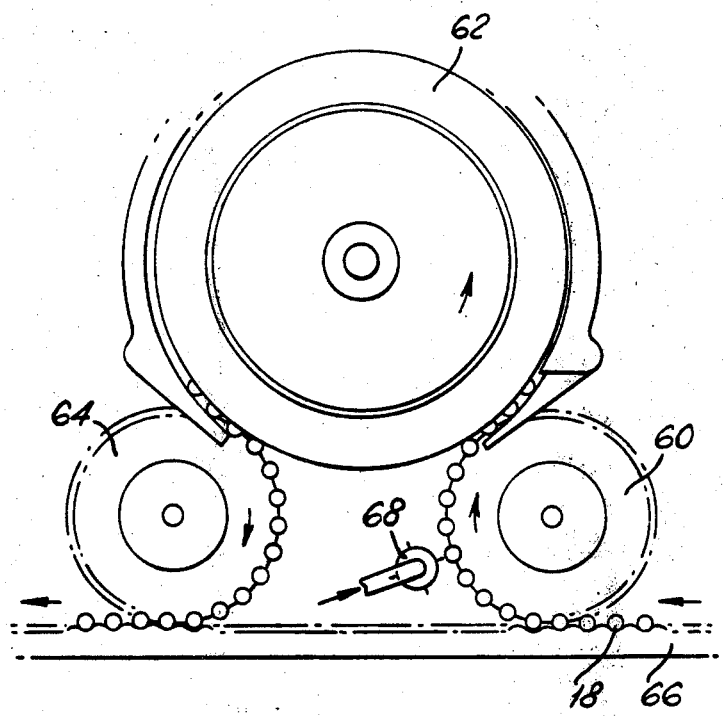
FIG. 3 shows diagrammatically a further way of forming the holes.

FIG. 1 shows diagrammatically a web of cigarette paper 2 which is fed through a printer 4 and then wrapped around a tobacco filler 6 at 8 to produce a continuous cigarette rod 10. This continuous rod 10 is then cut at 12 into cigarette-length portions 14 which are fed to a plug assembler 16. In the plug assembler 16 the cigarette portions 14 are united with lengths of filter material to produce filter tipped cigarettes 18. These filter tipped cigarettes are then fed through an inspection device 19 which checks whether any of the cigarettes 18 have unacceptable leaks in their wrappers. Any cigarettes found to be unsatisfactory are rejected. This is shown diagrammatically at 18A.

The cigarette paper 2 is unwound from a bobbin 20. In order that the cigarette making system does not have to be stopped when the bobbin 20 has been used up, a splicer 22 is provided to join the trailing end of the web 2 being unwound from the expiring bobbin 20 on to the leading end of the web 2' from a new bobbin 20A, while the cigarette making system continues to run.

The splicer 22 may be of any conventional type. A preferred type is described in British patent specification No. 1,086,065 as modified in accordance with British patent specifications Nos. 1,161,781 and 1,345,701. In this arrangement there is an accumulator which is shown diagrammatically at 24 in the accompanying drawings. A supply of cigarette paper 2 is built up in the accumulator 24 while the cigarette making system is drawing cigarette paper from the bobbin 20. Then when the bobbin 20 is nearly exhausted the cigarette making system can continue to be supplied from the accumulator 24 and the splice made on stationary webs. When the splice has been made the supply of cigarette paper is then drawn from the new bobbin 20A.

While the cigarette paper is stationary (that is, while the splicing is taking place) the holes of predetermined size may be formed in the cigarette paper, for example by pricking. This allows a high degree of accuracy in the forming of the holes which cannot be so readily obtained while the cigarette paper, or the finished cigarettes, are moving.

A mechanism for pricking the cigarette paper is shown diagrammatically in FIG. 1. This comprises a plate 30 with pins on it for pricking the holes in the cigarette paper. The plate 30 is movable towards the cigarette paper by a ram and is positioned so as to prick the cigarette paper 2' unwound from the new bobbin 20A. There may be a backing plate 32 to support the paper 2' during pricking. Alternatively the spiked plate 30 may be fixed and the plate 32 may be movable to press the paper 2' onto the pins.

Although a splicing mechanism in which the splicing is done on stationary webs is preferred, this arrangement could also be used with a splicing mechanism which forms a running splice, that is which splices the webs while they are moving. In this case the pricking of the new web 2' would take place while the web 2' was stationary before the actual splicing operation was initiated.

Where an accumulator is used, the portion of web between the splicer 22 and the accumulator 24 is of course stationary while the splicing operation is taking place. The pricking could therefore take place on this part of the web if that was preferred. The holes would then appear in front of the splice instead of after the splice.

There is preferably provision for ejecting the finished cigarettes which have the splice in their wrappers. This may be achieved in the manner described in British patent specification No. 1,318,032. Since the system described in that specification ejects a few cigarettes in the region of the splice (in order to be sure that no part of the splice remains on a cigarette which proceeds to a backing machine) the predetermined holes should be formed in the cigarette paper at a suitable distance from the splice to ensure that the cigarettes with holes are not ejected by the splice ejection mechanism.

After passing through the cigarette testing device 19 (FIG. 1) the cigarettes 18 preferably pass through a second ejection station 36. This ejects automatically any cigarettes containing the deliberately formed holes which have not been ejected by the testing device 19. This is shown diagrammatically at 18B.

Ejection of cigarettes with holes at the second ejection station 36 may be achieved as follows. When the machine operator presses a button to bring into operation the system for checking the cigarette testing device 19, thus forming holes in a number of cigarette-length portions of paper following a splice, an electrical control circuit is activated so as to eject at the second ejection station, for example, at ten cigarettes positions following the gap created by the ejection of cigarettes by the splice ejection device. For example, there may be means at or in the vicinity of the cigarette testing device 19 which, for a predetermined period after the button is pressed, ejects ten cigarettes immediately after detecting a gap of three or four cigarettes (i.e. the cigarettes ejected by the splice detecting system). Those ten cigarettes would this include any cigarettes which should have been ejected at the first ejection station. Instead of requiring the intervention of the operator to initiate the forming of the holes, the holes may be automatically formed every time the splicer is used. The testing device would then be checked once for each bobbin of cigarette paper used.

It may not be necessary to eject the cigarettes containing the deliberately formed holes which are not ejected by the testing device 19. It may be sufficient merely to check whether the cigarettes 18A ejected by the testing device 19 include all the cigarettes containing deliberately formed holes. Alternatively the second ejection station 36 may be replaced by a monitoring station which merely monitors how many of the cigarettes containing the deliberately formed holes are remaining after the testing device 19. In particular, the second ejection station 36 might not be necessary if the test cigarettes had leaks such that they ought not to be rejected by the testing device 19; that is if the deliberately formed holes were so small that they did not make the cigarettes unacceptable. This would check that the testing device was not too sensitive.

Another system according to this invention includes means for forming holes in the cigarette paper 2 at the printer 4 by which printed matter such as the name of the brand or the manufacturer is printed at regular intervals on the cigarette paper 2. By this means the holes can be formed at suitable positions in relation to the print to ensure that they are not covered by the cork in the filter attachment process. A memory device may be included to activate the second ejection device (if present); alternatively, the printer may be arranged to apply an additional dab of ink to the cigarettes with holes, this additional ink marking being detected further downstream, possibly immediately before the second ejection station.

A way of making the holes according to this example is shown in FIG. 2 which is a diagrammatic representation of the printer referenced 4 in FIG. 1.

Referring to FIG. 2, the web of cigarette paper 2 passes around pulleys 41 to 44 to a printing roller 45. The printing roller 45 prints the necessary matter on to the paper 2 which is at that point supported by a backing roller 46. The paper 2 then passes on around further pulleys 47 to 49 to be wrapped around the tobacco 6 at position 8. The printing roller 45 is inked by an inking roller 45A which receives ink from a reservoir (not shown).

The printer so far described is typical of conventional printers for cigarette making machines. The holes in this example, however, may be pricked into the cigarette paper by spikes on a roller 50 which is associated with the printer. The roller 50 is pressed against the paper 2 for a predetermined period (for example during one revolution). A backing roller 52 may support the paper 2 while the spiked roller 50 is pressed against it.

Alternatively the roller 52 may be movable to press the paper 2 temporarily against the spiked roller 50.

In this case the roller 50 may be driven continuously at a peripheral speed equal to the speed of the paper 2 and with its spikes timed in relation to the printing roller 45 so that the holes are formed in the paper at desired positions relative to the printed matter. An alternative is that the roller 50 may be permanently in contact with the paper 2 (running at paper speed) and have, instead of spikes, somewhat rounded knobs which do not puncture the paper until the paper is pressed firmly against the roller 50 by the separate movably mounted pressure roller 52. The holes may be formed by an abrading action.

The spiked roller 50 may be at any convenient position relative to the printing roller 45. However, it is preferable that the spiked roller 50 shold be relatively close to the backing roller 46 to assist good registration between the printed matter put on the cigarette paper 2 by the printing roller 45 and the holes made in the paper by the spiked roller 50.

Another possible system according to this invention is shown in FIG. 3. This works as follows. Fluted drums 60, 62 and 64 are part of the cigarette testing device generally referenced 19 in FIG. 1. (More specifically, the drums 60, 62 and 64 may respectively correspond to the drums 8, 1 and 9 shown in FIG. 1 of British patent specification No. 1,217,203). The drum 60 receives the cigarettes 18 from the plug assembler 16 and the cigarettes may be carried to the drum 60 by a fluted conveyor 66 (which may correspond to the conveyor 7 in FIG. 1 of British patent specification 1,217,203).

Adjacent to the cigarette carrying drum 60, just upstream of the testing drum 62, there is a spiked roller 68 which is permanently driven at a peripheral speed equal to the speed of the cigarettes 18 on the drum 60. This spiked roller 68 is moved into contact with the cigarettes 18 on the drum 60 so as to puncture a predetermined number of cigarettes when the system for checking the testing device is put into operation. A memory device or time delay system ensures (assuming this is indeed required by the cigarette manufacturer) that any punctured cigarettes which are not ejected at the first ejection station (i.e. by the cigarette testing device 19) are definitely ejected at the second ejection station 36. The spiked roller 68 may be moved into contact with the cigarettes by an electro-magnetic or pneumatic operating device (or manually) and may include a one-rev clutch or other device arranged to keep the spiked roller in contact with the cigarettes only during say one revolution, after which the spiked roller is automatically withdrawn from the cigarettes. The spiked roller may, for example, have four spikes at regular intervals on its circumference.

Instead of the spiked roller acting on the cigarettes 18 while they are on the cigarette carrying drum 60, the cigarettes 18 may be perforated at any position between the plug assembler 16 and the cigarette testing drum 62, either by use of a spiked roller or in other ways.

Instead of forming holes of one predetermined size the hole-forming mechanism in any system according to this invention may be arranged to form holes of various predetermined sizes, some of which should and some of which should not result in the cigarettes being ejected by the wrapper testing device if it is performing as required.

I claim:

1. A cigarette making system comprising a continuous rod cigarette making machine for producing cigarette portions, means for combining the cigarette portions with lengths of filter material to form filter tipped cigarettes, a first testing device for detecting leaks in the wrapper of the filter tipped cigarettes, means for feeding the cigarettes to the testing device, and first means associated with the testing device for ejecting faulty cigarettes, in which the cigarette making system includes, upstream of the position at which the cigarettes are tested, means for deliberately producing leaks of predetermined size in the wrapper of selected cigarettes, and monitoring means for detecting whether the cigarettes containing the deliberate leaks are ejected by the first ejection means comprising a second testing device having second ejection means positioned downstream of the first ejection means associated with the first cigarette testing device and arranged automatically to test and eject any of the cigarettes containing the deliberately make leaks which were not ejected by the first ejection means.

2. A cigarette making system according to claim 1 in which the cigarette making machine includes a printer and in which the deliberate leak producing means includes hole forming means arranged to form holes in the wrapper web at predetermined positions relative to the position in which printed matter is put on the web by the printer.

3. A cigarette making system according to claim 1 in which said leak producing means comprises a spiked wheel arranged to engage the wrapper web for making holes in the wrapper, the spiked wheel being held on a fixed axis and in which means are provided for changing the run of the wrapper web between a first position in which it is clear of the spiked wheel and a second position in which it engages the spiked wheel and has holes formed in it by the spiked wheel.

4. A cigarette making system according to claim 1 including a wheel adjacent to the run of the cigarette paper web, means for driving the wheel with a peripheral speed equal to the speed of the adjacent web, and pressure means for pressing the web firmly against the wheel, in which the wheel has protrusions on it which do not make holes in the web when the web contacts the wheel relatively lightly, but which do make holes in the web when the web is pressed more firmly against the wheel, and in which the pressure means is arranged to press the web sufficiently firmly against the wheel for the protrusions to make holes in the web.

5. A cigarette making system according to claim 1 wherein said cigarette making machine includes a paper wrapper supply mechanism having a splicer associated therewith for splicing between rolls of paper wrapper, said leak producing means providing holes in a spliced portion of said paper wrapper.

6. A cigarette making system according to claim 5 in wich the splicer is associated with a web accumulator, and in wich the splicer is arranged to splice stationary webs of paper wrapper upstream of the accumulator while a web of paper wrapper is supplied continuously from the accumulator.

7. A cigarette making system according to claim 5 in which the splicer is arranged to form a running splice, leak producing means being arranged to make holes in the leading portion of the new web of paper wrapper while it is stationary and before being set in motion for splicing.

8. A cigarette making system according to claim 5 wherein said first testing device includes means responsive to operation of said splicer for causing said first ejecting means to eject a series of cigarettes including those formed of the spliced portion of cigarette wrapper, said deliberate leak producing means being operable to provide deliberate leaks in several successive cigarettes following said series, and said second ejection means being responsive to a gap in the cigarettes received from said first testing device corresponding to said series of cigarettes for ejecting any of the cigarettes containing the deliberately make leaks which were not ejected by the first ejection means.

9. In a method of making cigarettes including the steps of forming a filler, enclosing the filler in a wrapper to form a continuous rod, severing the rod to form cigarette portions, testing the cigarette portions to detect leaks in the wrappers thereof, segregating those cigarette portions which are found to have leaks, the improvement comprising the further step of deliberately providing the wrapper of selected cigarette portions with leaks capable of being detected during testing of the cigarette portions so that these selected cigarette portions will be segregated and again testing those cigarette portions not segregated as a result of said first testing thereof to detect leaks in the wrappers and thereby determine the effectiveness of said first testing step.

10. A method according to claim 9 in which the deliberate leaks are holes hich are formed in the cigarette wrapper before it is wrapped around the filler.

11. A method according to claim 9 in which the leaks are formed in the wrapper of completed cigarettes.

12. A method according to claim 9 wherein the deliberate leaks are formed in a portion of the wrapper which has been spliced.

13. A cigarette making system comprising a continuous rod cigarette making machine, a first testing device for detecting leaks in the paper wrapper of cigarettes produced by said cigarette making machine, a first ejecting mechanism responsive to said first testing device for ejecting cigarettes having leaks, leak producing means for deliberately providing leaks in the paper wrapper associated with certain cigarettes so as to cause the certain cigarettes to be ejected, a second testing device downstream of said first testing device for detecting leaks in the paper wrapper of cigarettes, and a second ejecting mechanism responsive to said second testing device for ejecting any deliberately leaky cigarettes not ejected by said first ejecting mechanism.

* * * * *

UNITED STATES PATENT OFFICE
CERTIFICATE OF CORRECTION

Patent No. 4,059,120     Dated   November 22, 1977

Inventor(s)  Desmond Walter Molins et al

It is certified that error appears in the above-identified patent and that said Letters Patent are hereby corrected as shown below:

---

UNITED STATES PATENT OFFICE
CERTIFICATE OF CORRECTION

Patent No.  4,059,085     Dated  November 22, 1977

Inventor(s)  Wilfred Percival Mansfield and Theodor Priede

It is certified that error appears in the above-identified patent and that said Letters Patent are hereby corrected as shown below:

Please correct the priority information to read as follows:

--UKPA No. 17577/75, filed April 28, 1975--

Claim 1, Column 6, line 8, change "rending" to --tending--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks